United States Patent
Itoh et al.

(10) Patent No.: US 11,316,437 B2
(45) Date of Patent: Apr. 26, 2022

(54) ELECTRONIC CIRCUIT AND WIRELESS POWER TRANSMISSION DEVICE

(71) Applicant: KABUSHIKI KAISHA TOSHIBA, Minato-ku (JP)

(72) Inventors: Jun-ichi Itoh, Nagaoka (JP); Keisuke Kusaka, Nagaoka (JP); Shunsuke Takuma, Nagaoka (JP); Koki Yamanokuchi, Nagaoka (JP); Shuichi Obayashi, Yokohama (JP); Yasuhiro Kanekiyo, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 8 days.

(21) Appl. No.: 16/944,827

(22) Filed: Jul. 31, 2020

(65) Prior Publication Data
US 2021/0036625 A1    Feb. 4, 2021

(30) Foreign Application Priority Data
Aug. 2, 2019    (JP) .............................. JP2019-143225

(51) Int. Cl.
*H02M 5/293*    (2006.01)
*H02M 5/297*    (2006.01)
(Continued)

(52) U.S. Cl.
CPC ............. *H02M 5/293* (2013.01); *H02J 50/12* (2016.02); *H02M 5/297* (2013.01); *H02M 1/348* (2021.05)

(58) Field of Classification Search
CPC ............ H02J 50/10; H02J 50/12; H02M 1/12; H02M 1/32; H02M 1/34; H02M 1/348; H02M 5/293–297
See application file for complete search history.

(56) References Cited

U.S. PATENT DOCUMENTS

| | | | |
|---|---|---|---|
| 2015/0085551 A1* | 3/2015 | Inomata | H02M 5/293 363/163 |
| 2015/0102797 A1* | 4/2015 | Kinomura | H02M 5/293 323/311 |

(Continued)

OTHER PUBLICATIONS

Kato et al., "Development of a Novel Commutation Method which Drastically Suppresses Commutation Failure of a Matrix Converter", IEEJ Trans. IA, vol. 127, No. 8, 2007, 9 pages(with English Abstract).

(Continued)

*Primary Examiner* — Fred E Finch, III
(74) *Attorney, Agent, or Firm* — Oblon, McClelland, Maier & Neustadt, L.L.P.

(57) ABSTRACT

An electronic circuit to receive input AC signals having different phases, and to control bidirectional switches corresponding to phases to generate, based on input AC signals having the phases, output AC signals having the phases and having a frequency different from a frequency of the input AC signals, the electronic circuit has reference signal circuitry to generate a reference signal having a frequency higher than the frequency of the output AC signals, and a commutation circuitry to control switching between voltage commutation and current commutation, wherein, in the voltage commutation, the commutation circuitry switches the bidirectional switches corresponding to the phases in sequence based on a voltage level of the output AC signals of the phases before and after a time point when an amplitude of the reference signal becomes a specific amplitude value, and in the current commutation, the commutation circuitry switches the bidirectional switches in parallel.

18 Claims, 12 Drawing Sheets

(51) Int. Cl.
*H02J 50/12* (2016.01)
*H02M 1/34* (2007.01)

(56) References Cited

U.S. PATENT DOCUMENTS

| | | | |
|---|---|---|---|
| 2015/0130431 A1* | 5/2015 | Yamazaki | H02M 5/293 323/272 |
| 2015/0130432 A1* | 5/2015 | Yamazaki | H02M 5/297 323/272 |
| 2016/0054751 A1* | 2/2016 | Inomata | H02M 5/297 323/300 |
| 2016/0056706 A1* | 2/2016 | Inomata | H02M 5/293 323/271 |
| 2016/0094139 A1* | 3/2016 | Yamazaki | H02M 5/297 363/163 |
| 2018/0048242 A1* | 2/2018 | Ichiki | H02M 5/27 |
| 2018/0262103 A1* | 9/2018 | Afsharian | H02M 1/4233 |
| 2020/0235674 A1* | 7/2020 | Tokusaki | H02M 1/425 |

OTHER PUBLICATIONS

Kusaka et al., "Fundamental analysis of Three-phase Inductive Power Transfer System with 12 coils", SPC-17-127, 2017, 6 pages (with English Abstract).

Kusaka et al., "Radiative Noise Reduction Technique Using 12 Coils Suitable for High-Power Inductive Power Transfer", 2018 IEEE Energy Conversion Congress and Exposition (ECCE), 2018, pp. 6179-6186.

Itoh et al. "A Control Method for the Matrix Converter Based on Virtual AC/DC/AC Conversion Using Carrier Comparison Method", IEEJ Trans. IA, vol. 124, No. 5, 2004, pp. 457-463 (with English Abstract).

Kato et al. "Improvement of Input Current Waveforms for a Matrix Converter Using a Novel Hybrid Commutation Method", 2007 Power Conversion Conference, 2007, pp. 763-768.

Koiwa et al., "Improvement of Commutation Sequence for AC-AC Direct Converter", IEEJ Trans. IA, vol. 134, No. 11, 2014, pp. 980-981 (with English Abstract).

Itoh et al., "Three-phase Wireless Power Supply Sytem Using Matrix Coverter", IEEE European Power Electronics Conference-Digest-, 2019, 10 pages.

* cited by examiner

| PARAMETER | SYMBOL | VALUE |
|---|---|---|
| THREE-PHASE AC VOLTAGE | $v_{ac}$ | 200V |
| RATED OUTPUT POWER | $P_{out}$ | 3kW |
| INPUT FREQUENCY | $f_{in}$ | 50Hz |
| INPUT FILTER | $L_f$ | 110 $\mu$H |
| RESONANT INDUCTANCE | $C_f$ | 2.2 $\mu$F |
| RESONANT CAPACITANCE | $L_R$ | 107 $\mu$F |
| RESONANT FREQUENCY | $C_R$ | 20kHz |
| RESISTANCE LOAD | $R_{load}$ | 2 $\Omega$ |
| CARRIER FREQUENCY | $f_c$ | 60kHz |
| DEAD TIME | $T_d$ | 0.2 $\mu$s |
| VOLTAGE COMMUTATION PERIOD | $T_{VCOMM}$ | 1.6 $\mu$s |
| MODULATION COEFFICIENT | a | 0.866 |

FIG. 8

ELECTRONIC CIRCUIT AND WIRELESS POWER TRANSMISSION DEVICE

CROSS REFERENCE TO RELATED APPLICATIONS

This application is based upon and claims the benefit of priority from the prior Japanese Patent Application No. 2019-143225, filed on Aug. 2, 2019, the entire contents of which are incorporated herein by reference.

FIELD

Embodiments of the present invention relate to an electronic circuit and a wireless power transmission device.

BACKGROUND

In wireless power transmission technology, it is proposed to use a matrix converter that directly converts power from a three-phase AC voltage to a three-phase AC voltage.

There are a matrix converter based on voltage commutation and a matrix converter based on current commutation. However, to avoid commutation failure such as surge voltages in an inductive load due to short-circuit of power supply voltages or load release attributed to errors or delays of a voltage sensor or a current sensor, there is proposed a matrix converter based on hybrid commutation that combines voltage commutation and current commutation.

On the other hand, when a matrix converter based on hybrid commutation performs the voltage commutation, it is desirable that the matrix converter includes a current sensor that enables high-speed and high-accuracy detection of a zero-cross point of a high-frequency current at the output side. This type of current sensor is high in cost and large in size. In addition, a matrix converter based on hybrid commutation that frequently performs the voltage commutation may deteriorate in total harmonic distortion (THD) of an input current due to commutation errors. Furthermore, a matrix converter based on hybrid commutation may cause complication of control due to compensation of commutation errors and may cause commutation failure at the time of switching input voltages.

BRIEF DESCRIPTION OF THE DRAWINGS

FIG. 8 is a view illustrating various parameters of the electronic circuit set by running a simulation;

DETAILED DESCRIPTION

According to one embodiment, a n electronic circuit configured to receive input AC signals having phases different from one another, and to control bidirectional switches corresponding to the phases to generate output AC signals having the phases and having a frequency different from a frequency of the input AC signals, and to output the output AC signals, the electronic circuit comprising:

reference signal circuitry configured to generate a reference signal having a frequency higher than the frequency of the output AC signals; and commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry is configured to switch the bidirectional switches in parallel based on a current level of the output AC signals of the phases in a second period other than the first period.

Embodiments of an electronic circuit and a wireless power transmission device will now be described with reference to the drawings. Hereinafter mainly described are main components of the electronic circuit and the wireless power transmission device. Note that the electronic circuit and the wireless power transmission device may have components and functions that are not illustrated or described herein.

Figure 1:
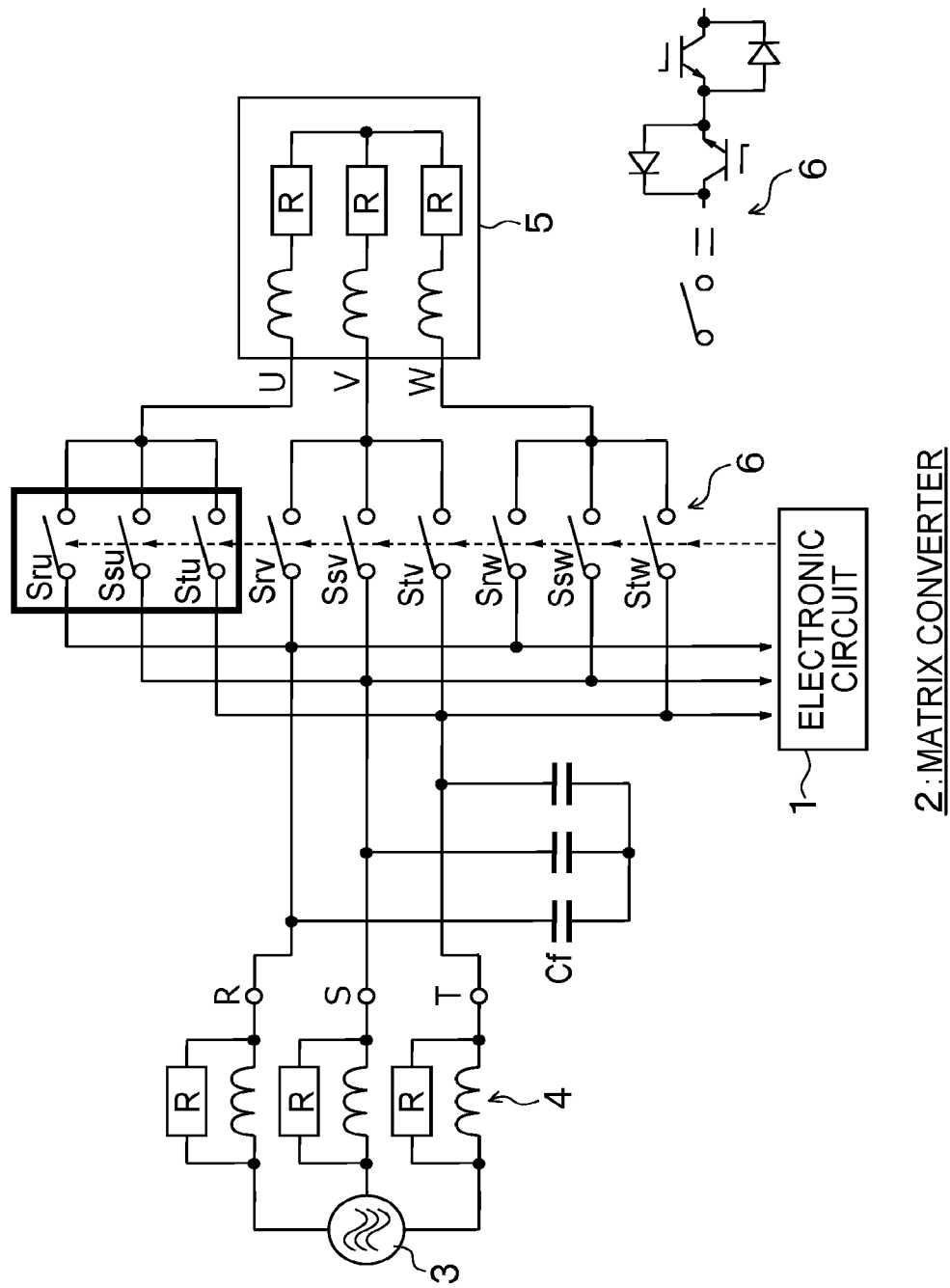
FIG. 1 is a block diagram of a schematic design of a matrix converter including an electronic circuit according to an embodiment.

A matrix converter according to an embodiment includes bidirectional switches. Based on a multiphase input AC signal having a plurality of phases different from one another, the bidirectional switches generate a multiphase output AC signal having a frequency different from that of the multiphase input AC signal. For that reason, the bidirectional switches are associated with each phase. Hereinafter described is an example in which the number of plurality of phases is three. FIG. 1 is a block diagram illustrating a schematic configuration of a matrix converter 2 including an electronic circuit 1 according to an embodiment. The matrix converter 2 illustrated in FIG. 1 includes an input filter 4 connected to each phase path of a three-phase power supply 3, a capacitor Cf connected between the phase paths, nine bidirectional switches 6 disposed between the phase paths and a load circuit 5, and an electronic circuit 1 that controls switching of these bidirectional switches 6. Each bidirectional switch 6 can be configured by connecting sources and drains of two MOS transistors in opposite directions as illustrated in detail at the lower right of FIG. 1.

In FIG. 1, phases of the three-phase power supply 3 are referred to as R-phase, S-phase, and T-phase, and the three paths between the nine bidirectional switches 6 and the load circuit 5 are referred to as U-phase, V-phase, and W-phase. The matrix converter 2 in FIG. 1 includes three bidirectional switches per phase. In FIG. 1, three bidirectional switches Sru, Ssu, and Stu corresponding to U-phase are shown by a rectangle with thick line.

Figure 2:
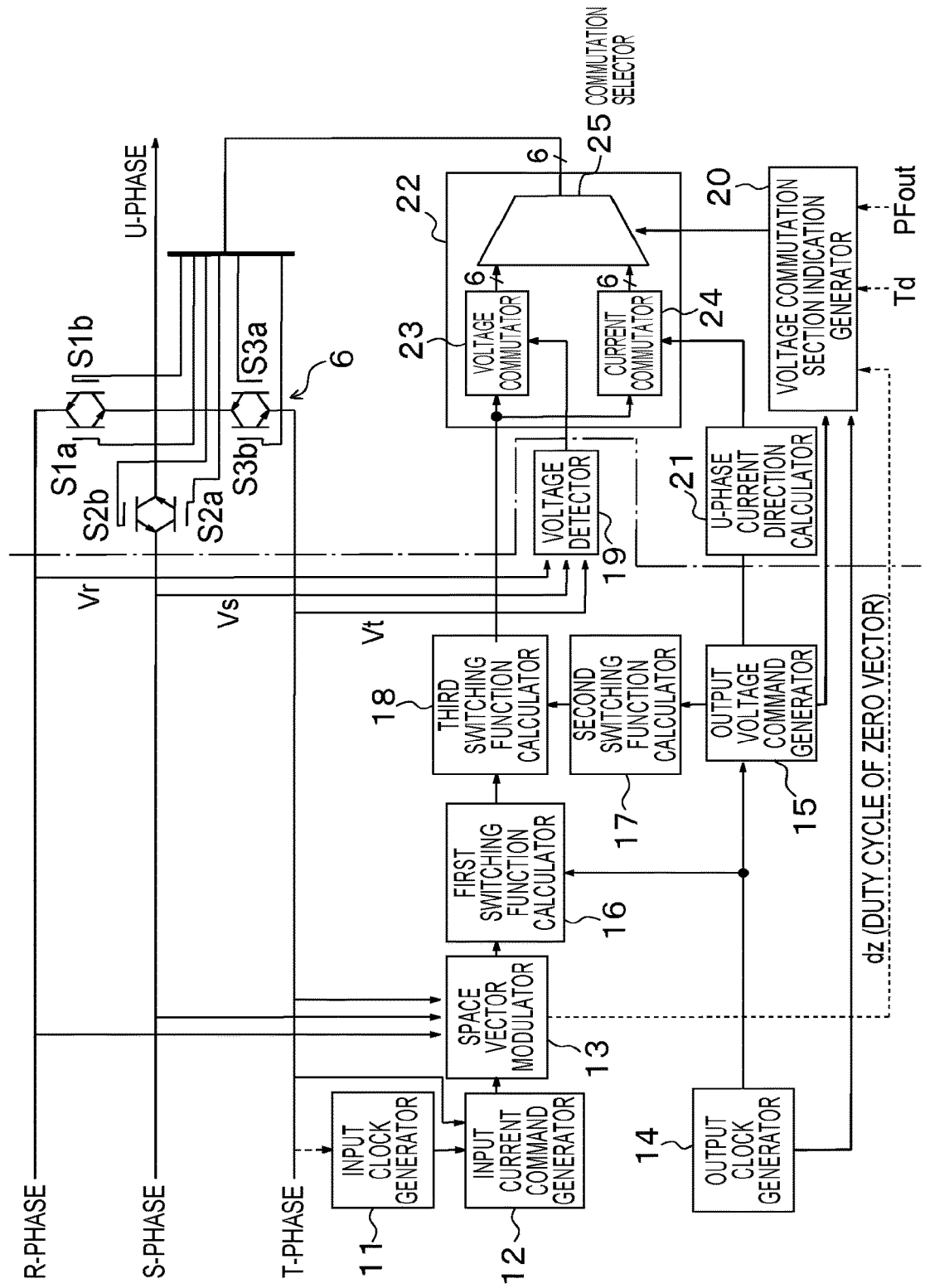
FIG. 2 is a block diagram of an internal configuration of the electronic circuit illustrated in FIG. 1.
Figure 3:
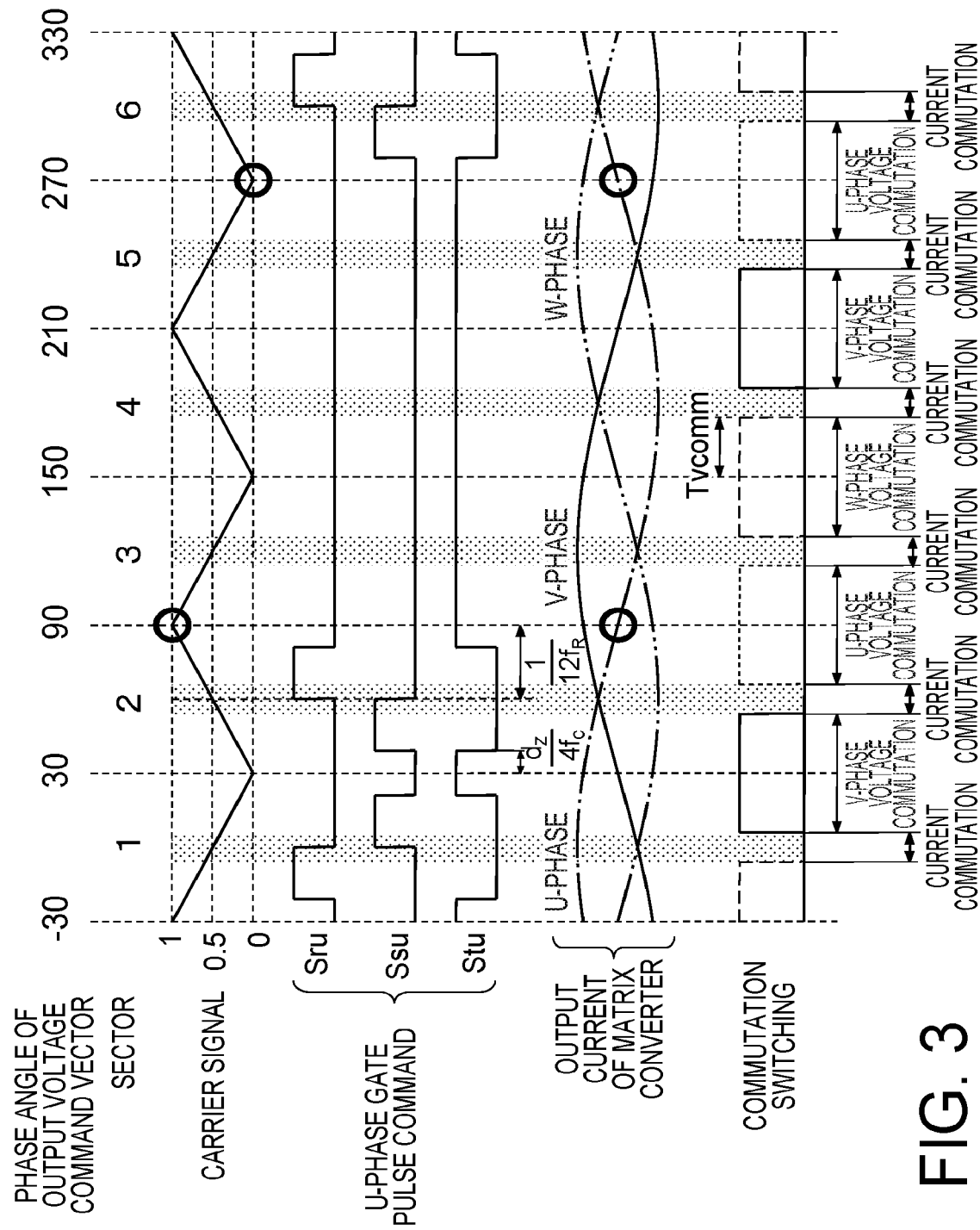
FIG. 3 is a view of a signal waveform of each part within the electronic circuit illustrated in FIG. 2.

FIG. 2 is a block diagram of an internal configuration of the electronic circuit 1 illustrated in FIG. 1. FIG. 3 is a view of a signal waveform of each part within the electronic circuit 1 illustrated in FIG. 2. In FIG. 2, the left side of the dash-dotted line represents a block configuration common to U-phase, V-phase, and W-phase, and the right side of the dash-dotted line represents a block configuration of U-phase. In other words, on the right side of the dash-dotted line in FIG. 2, there are block configurations of V-phase and W-phase not illustrated. Since the phases on the right side of the dash-dotted line have a common block configuration, FIG. 2 illustrates the block configuration of U-phase.

Figure 4:
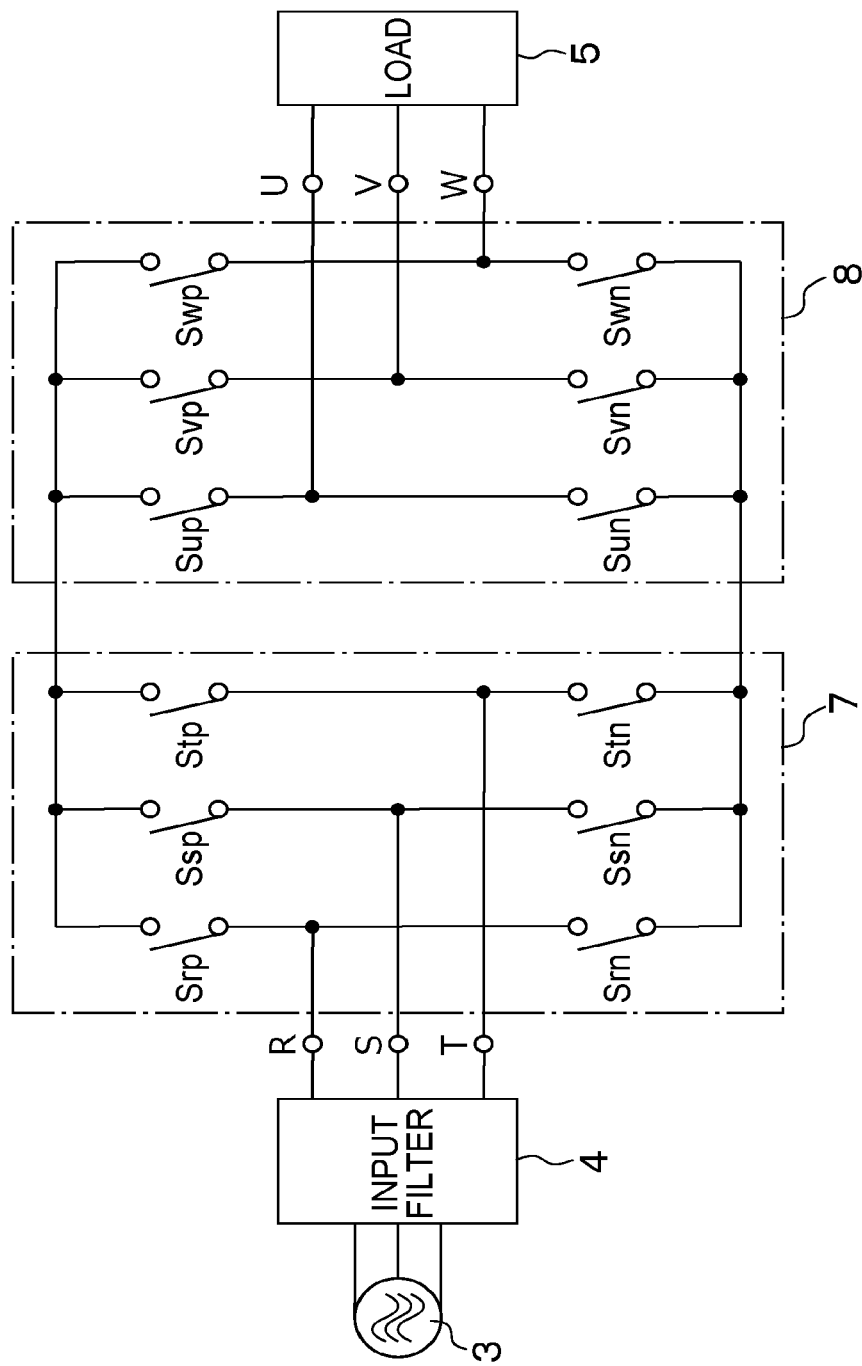
FIG. 4 is a circuit diagram of an indirect matrix converter that operates in an equivalent manner to the matrix converter illustrated in FIG. 1.

Before describing the configuration of the electronic circuit 1 in FIG. 2, virtual AC/DC/AC conversion, one of the control methods of the matrix converter 2 will be described. FIG. 4 is a circuit diagram of an indirect matrix converter 2 that operates in an equivalent manner to the matrix converter 2 illustrated in FIG. 1. The indirect matrix converter 2 in FIG. 4 includes a current-based virtual pulse width modulator (PWM) rectifier 7 and a voltage-based virtual inverter 8 between an input filter 4 and a load circuit 5. AC direct converters such as the matrix converter 2 include no energy buffer. For this reason, AC direct converters are to be controlled simultaneously at the input side and the output side, which causes complication of control. Accordingly, in this embodiment, the matrix converter 2 employs a control method based on virtual AC/DC/AC conversion in which the input side and the output side are regarded separately utilizing the fact that an input/output relation is equal to that of the indirect matrix converter 2. Herein, in order to reduce the number of switching times, the current-based virtual PWM rectifier 7 modulates a space vector, and the voltage-based virtual inverter 8 performs single-pulse driving and pulse synthesis to perform switching of the matrix converter 2.

The current-based virtual PWM rectifier 7 in FIG. 4 includes switches Srp and Srn connected to R-phase, switches Ssp and Ssn connected to S-phase, and switches Stp and Stn connected to T-phase. The voltage-based virtual inverter 8 includes switches Sup and Sun connected to U-phase, switches Svp and Svn connected to V-phase, and switches Swp and Swn connected to W-phase. The other ends of the switches Srp, Ssp, Stp, Sup, Svp and Swp are commonly connected, and the other ends of the switches Srn, Ssn, Stn, Sun, Svn and Swn are also commonly connected. These twelve switches are bidirectional switches.

To make the indirect matrix converter 2 in FIG. 4 and the matrix converter 2 in FIG. 1 equal in input current and output voltage, the following Formula (1) may be established between a switching function of the matrix converter 2 in FIG. 1 (hereinafter referred to as "first switching function") and a switching function of the indirect matrix converter 2 in FIG. 4 (hereinafter referred to as "second switching function").

$$\begin{bmatrix} S_{ru} & S_{su} & S_{tu} \\ S_{rv} & S_{sv} & S_{tv} \\ S_{rw} & S_{sw} & S_{tw} \end{bmatrix} = \begin{bmatrix} S_{up} & S_{un} \\ S_{vp} & S_{vn} \\ S_{wp} & S_{wn} \end{bmatrix} \begin{bmatrix} S_{rp} & S_{sp} & S_{tp} \\ S_{rn} & S_{sn} & S_{tn} \end{bmatrix} \quad (1)$$

The left-hand side of Formula (1) represents the switching function of the matrix converter 2 in FIG. 1, and the right-hand side represents the switching function of the indirect matrix converter 2 in FIG. 4. More specifically, the matrix of the first factor on the right-hand side shows the first switching function of the voltage-based virtual inverter 8 in the indirect matrix converter 2 in FIG. 4, and the matrix of the second factor on the right-hand side shows the second switching function of the current-based virtual PWM rectifier 7.

Figure 5:
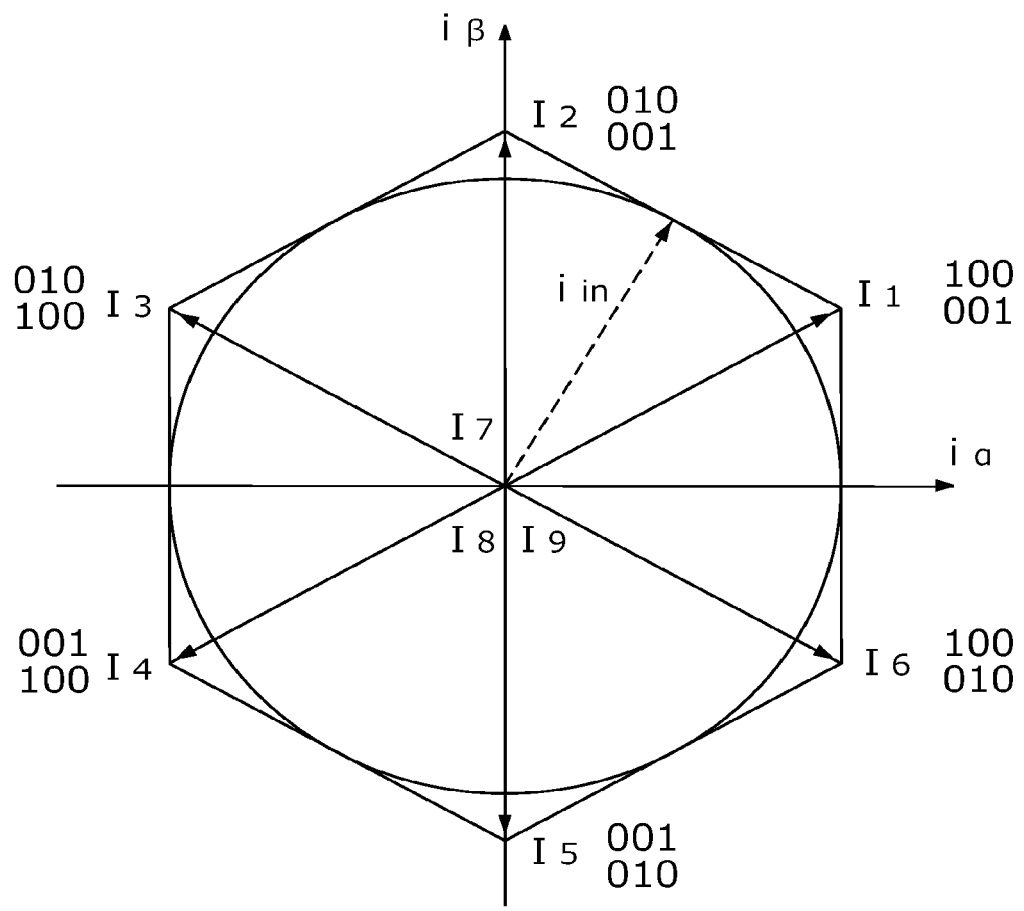
FIG. 5 is a vector diagram illustrating directions and switching patterns of a reference vector used in a current-based virtual PWM rectifier.

FIG. 5 is a vector diagram illustrating directions and switching patterns of a reference vector used in the current-based virtual PWM rectifier 7. As illustrated, reference vectors I2, I1, I6, I5, I4, and I3 used in the current-based virtual PWM rectifier 7 are arranged in directions different by 60 degrees in a two-dimensional space represented by α axis and β axis. There are also three zero vectors I7, I8, and I9. For example, the switching pattern of the reference vector I1 is expressed by the following Formula (2).

$$I_1 = \begin{bmatrix} S_{rp} & S_{sp} & S_{tp} \\ S_{rn} & S_{sn} & S_{tn} \end{bmatrix} = \begin{bmatrix} 1 & 0 & 0 \\ 0 & 0 & 1 \end{bmatrix} = \begin{bmatrix} \text{ON} & \text{OFF} & \text{OFF} \\ \text{OFF} & \text{OFF} & \text{ON} \end{bmatrix} \quad (2)$$

The dashed arrow line in FIG. 5 shows an input current command vector iin at a certain time. The input current command vector iin starts from the positive side on a axis corresponding to an angle of 0 degree and rotates at an angular velocity ωin=2πfin. Here, fin is a frequency of an input three-phase AC signal.

In the vector diagram illustrated in FIG. 5, when an input current command vector is in a certain equilateral triangle region, three instantaneous current vectors that form the vertices of the equilateral triangle region are referred to as Ia, Ib, and Iz. In other words, two reference vectors adjacent to the input current command vector are referred to as Ia and Ib, and one zero vector is referred to as Iz.

For example, in a time section where an input current command vector is between 30 degrees and 90 degrees, I1 is selected as Ia from two reference vectors adjacent to the input current command vector, and I2 is selected as Ib. Furthermore, when the maximum phase is R-phase, I7 is selected as Iz. When the maximum phase is S-phase, I8 is selected. When the maximum phase is T-phase, I9 is selected. Accordingly, the maximum phase of the input phase voltages having absolute values is kept in the ON state to suppress the number of switching times.

Note that a zero vector is divided into two parts above and below a carrier signal in order to prevent redundant switching when the switching function of the matrix converter 2 is output.

In space vector modulation using the vector diagram illustrated in FIG. 5, when αβ components of Ia, Ib, and Iz are referred to as Iaα, Iaβ, Ibβ, Ibβ, Izα, and Izβ, an input current command vector is represented by Formula (3) by three-phase to two-phase conversion.

$$\begin{bmatrix} I_\alpha \\ I_\beta \\ 1 \end{bmatrix} = \begin{bmatrix} I_{a\alpha} & I_{b\alpha} & I_{z\alpha} \\ I_{a\beta} & I_{b\beta} & I_{z\beta} \\ 1 & 1 & 1 \end{bmatrix} \begin{bmatrix} d_a \\ d_b \\ d_z \end{bmatrix} \quad (3)$$

In Formula (3), each component of a zero vector is Izα=Izβ=0. Duty cycles da, db, and dz of the current-based virtual PWM rectifier 7 are obtained by Formula (4) using the Cramer's rule and the aforementioned $Iz\alpha=Iz\beta=0$.

$$d_a = \frac{\begin{vmatrix} I_\alpha & I_{b\alpha} \\ I_\beta & I_{b\beta} \end{vmatrix}}{\begin{vmatrix} I_{a\alpha} & I_{b\alpha} \\ I_{a\beta} & I_{b\beta} \end{vmatrix}} \quad (4)$$

$$d_b = \frac{\begin{vmatrix} I_{a\alpha} & I_\alpha \\ I_{a\beta} & I_\beta \end{vmatrix}}{\begin{vmatrix} I_{a\alpha} & I_{b\alpha} \\ I_{a\beta} & I_{b\beta} \end{vmatrix}}$$

$$dz = 1 - da - db$$

In this manner, since an input current command vector rotates at the angular velocity $\omega in=2\pi fin$ from the initial value, the input current command vector $iin(*)=[I\_\alpha I\_\beta]$ at any time is given to the current-based virtual PWM rectifier 7. The current-based virtual PWM rectifier 7 determines the reference vectors Ia and Ib depending on which of the six equilateral triangle regions in FIG. 5 includes the given input current command vector, and then, determines a-axis components Ia$\alpha$ and Ib$\alpha$ and $\beta$-axis components Ia$\beta$ and Ib$\beta$. Furthermore, when the maximum phase is R-phase, I7 is selected as one zero vector Iz. When the maximum phase is S-phase, I8 is selected. When the maximum phase is T-phase, I9 is selected. Accordingly, the maximum phase of input phase voltages having absolute values is kept in the ON state to suppress the number of switching times. Still further, the duty cycles da, db, and dz are obtained by Formula (4).

Figure 6A:
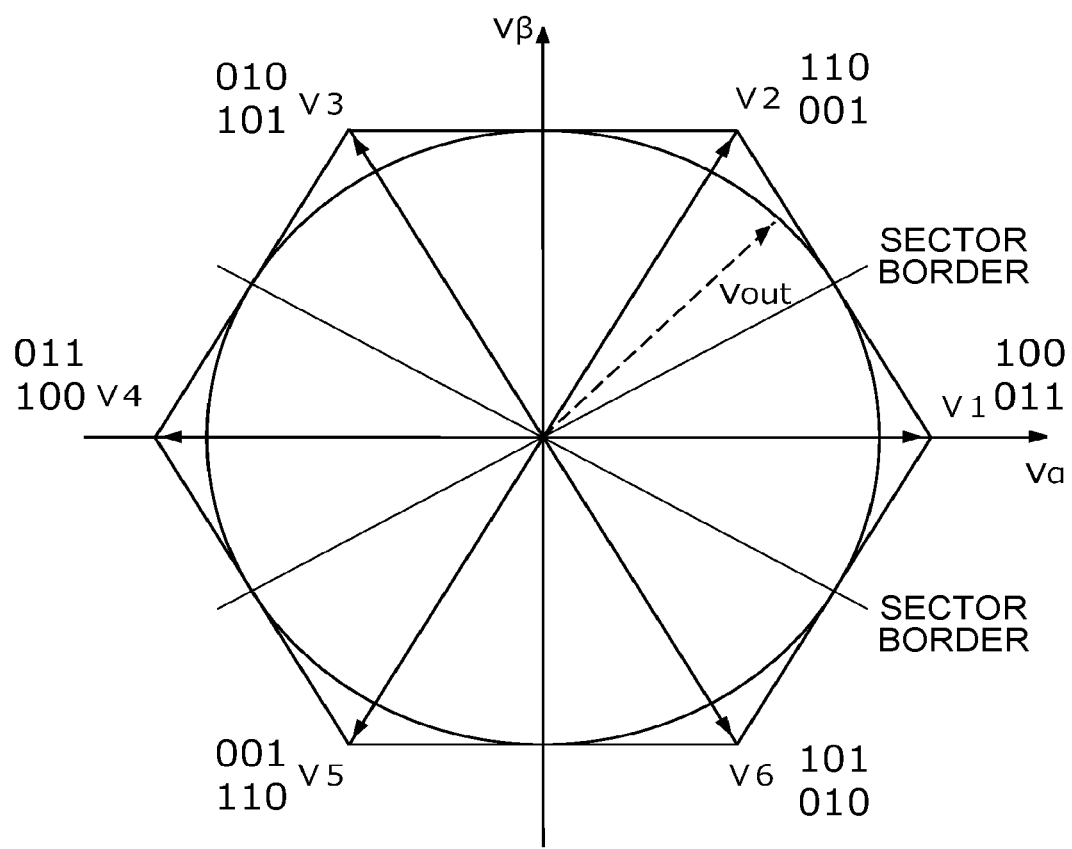
FIG. 6A is a vector diagram illustrating directions and switching patterns of a reference vector used in a voltage-based virtual inverter.
Figure 6B:
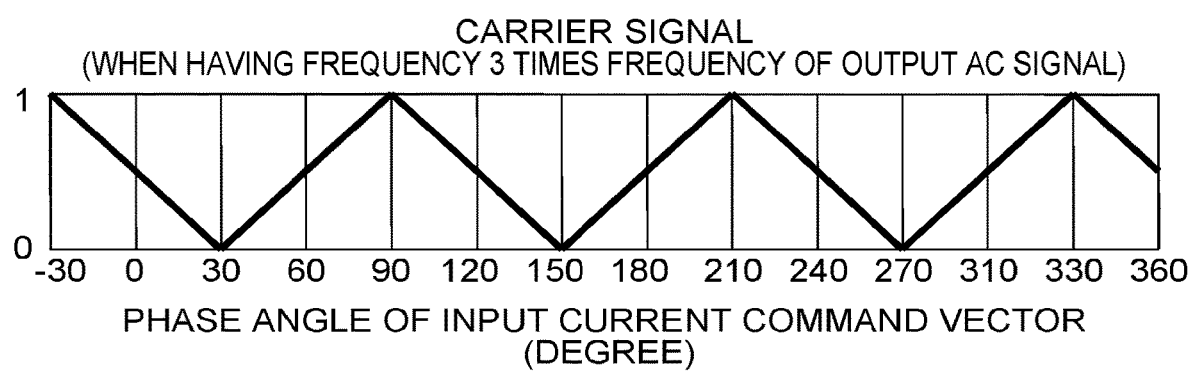
FIG. 6B is a view illustrating a relation between a carrier signal and a phase angle of an output voltage command vector.

FIG. 6A is a vector diagram illustrating directions and switching patterns of a reference vector used in the voltage-based virtual inverter 8. FIG. 6B is a view illustrating a relation between a carrier signal and a phase angle of an output voltage command vector. As illustrated in FIG. 6A, reference vectors V2, V1, V6, V5, V4, and V3 used in the voltage-based virtual inverter 8 are arranged in directions different by 60 degrees in a two-dimensional space represented by a axis and $\beta$ axis. For example, a switching pattern of the reference vector V1 is expressed by the following Formula (5).

$$V_1 = \begin{bmatrix} S_{up} & S_{vp} & S_{wp} \\ S_{un} & S_{vn} & S_{wn} \end{bmatrix} = \begin{bmatrix} 1 & 0 & 0 \\ 0 & 1 & 1 \end{bmatrix} = \begin{bmatrix} ON & OFF & OFF \\ OFF & ON & ON \end{bmatrix} \quad (5)$$

The dashed arrow line in FIG. 6A shows an output voltage command vector vout at a certain time. The output voltage command vector vout starts from the positive side on a axis corresponding to an angle of 0 degree and rotates at an angular velocity $\omega out=2\pi fout$. Here, fout is a fundamental frequency of an output. In this embodiment, fout is equal to a resonant frequency fR of the load circuit 5. A frequency fc of a carrier signal is generally three times, or 3N times (N is a natural number), as high as fout. In this embodiment, fc=3×fout.

When an output voltage command vector at a certain time is given, a reference vector closest to the output voltage command vector is selected. For example, when an output voltage command vector crosses 30 degrees, the reference vector is changed from V1 to V2. At this time, as can be seen from FIG. 6A, the switch Svp is switched from 0 (off) to 1 (on) and the switch Svn is switched from 1 (on) to 0 (off), but the switching functions of the other four switches are not changed.

The single-pulse driving enables the voltage-based virtual inverter 8 to reduce the number of switching times more than the space vector modulation. Although total harmonic distortion (THD) of an output current is deteriorated, the influence is small in a resonant load because the impedance of components except for a resonant frequency component is high.

In the pulse synthesis represented by Formula (1), switching of a zero vector of the current-based virtual PWM rectifier 7 and switching of a voltage vector of the voltage-based virtual inverter 8 may be synchronized in order to prevent redundant switching. In fact, when the voltage vector of the voltage-based virtual inverter 8 is set to be switched and the zero vector of the current-based virtual PWM rectifier 7 is set to be generated at a peak and a bottom of a carrier signal, it is possible to reliably switch voltages of the voltage-based virtual inverter 8 within the zero vector.

The matrix converter 2 in FIG. 1 employs hybrid commutation that combines voltage commutation and current commutation. In regard to the hybrid commutation, this embodiment employs the method recited in a paper previously published by the inventors (Kato, Itoh, "Development of a New Commutation Method which Drastically Suppresses Commutation Failure of a Matrix Converter", TED Journal of Industry Applications, Vol. 127, Issue 8, 2007). The voltage commutation is performed by monitoring magnitudes (small, medium, and large) of a voltage level of a three-phase input AC signal. Before and after a time point when the magnitudes of the voltage level of the three-phase input AC signal are changed, simultaneously turning on a plurality of switches connected to a plurality of input phase paths shorts a plurality of input AC signals, which causes input current distortion. Therefore, switching is to be controlled not to turn on the plurality of switches simultaneously.

The current commutation is performed by monitoring an output current direction. At this time, when a current is commutated before and after a time point when an output current crosses zero, there is a possibility that a current source on the output side may be opened and a surge voltage may be generated. Therefore, the current commutation requires caution.

From the above description, in the hybrid commutation, it is desirable to set threshold values, for example, for an input voltage and an output current and perform the voltage commutation before and after a time point when the output current crosses zero and perform the current commutation before and after a time point when magnitudes of the input voltage are changed.

However, when the matrix converter 2 in FIG. 1 is used as it is for wireless power transmission, usually, the output side is not provided with a current sensor which is necessary for the current commutation and which detects a time point when a high-frequency current output from the matrix converter 2 crosses zero. As will be described later, the electronic circuit 1 according to this embodiment determines a commutation method of the matrix converter 2 in FIG. 1 without using the aforementioned current sensor. At this time, the commutation method is determined considering that an output current becomes a sine wave, which is a phenomenon unique to wireless power transmission, and that an output power factor fluctuates when a transmission coil is displaced.

Next, the configuration and operation of the electronic circuit 1 according to this embodiment will be described with reference to FIGS. 2 and 3. The electronic circuit 1 according to this embodiment controls on/off switching of the bidirectional switches 6 that directly convert a three-phase input AC signal into a three-phase output AC signal. The bidirectional switches 6 are provided in plural per phase. It is assumed that a frequency of the three-phase output AC signal is higher than that of the three-phase input AC signal.

As shown in FIG. 2, the electronic circuit 1 according to this embodiment includes an input clock generator 11, an input current command generator (first command signal generator) 12, a space vector modulator 13, an output clock generator 14, an output voltage command generator (second command signal generator) 15, a first switching function calculator 16, a second switching function calculator 17, a third switching function calculator 18, and a voltage detector 19 as a block configuration common to each phase.

Furthermore, the electronic circuit 1 according to this embodiment includes a voltage commutation section indicator (commutation section indication generator) 20, a current direction calculator 21, and a commutation controller (circuitry) 22 which are provided per phase. For simplicity sake, FIG. 2 shows the voltage commutation section indicator 20, the current direction calculator 21, and the commutation controller 22 in U-phase.

Among the block configuration inside the electronic circuit 1 in FIG. 2, the output voltage command generator 15 and the commutation controller 22 are preferable components.

The output voltage command generator 15 includes a built-in reference signal generator that generates a carrier signal (reference signal) having a frequency higher than that of the three-phase output AC signal. The carrier signal alternately and periodically includes peaks and bottoms (that carrier signal is, for example, a triangular wave signal). The carrier signal has, for example, a frequency that is an integral multiple of 3 of the frequency of the three-phase output AC signal.

The commutation controller 22 switches the bidirectional switches between the voltage commutation and the current commutation. In the voltage commutation, based on a voltage level of the output AC signal of each phase, the commutation controller switches the bidirectional switches corresponding to each phase in sequence in a predetermined period before and after a time point when the carrier signal has a predetermined amplitude value. In the current commutation, based on a current level of the output AC signal of each phase, the commutation controller 22 switches the bidirectional switches in parallel in a period other than the predetermined period. For example, in a phase among the plurality of phases in which a current of the three-phase output AC signal is estimated to be zero, the commutation controller 22 selects the voltage commutation in the predetermined period including a time point when the current of the three-phase output AC signal reaches zero and selects the current commutation at a time point common to all phases in a period other than the predetermined period. More specifically, the commutation controller 22 selects the voltage commutation for any phase within the predetermined period including time points when the carrier signal is at a peak and a bottom. The bold circles in FIG. 3 clearly show examples of time points (peak and bottom) when the U-phase voltage commutation in the carrier signal is performed.

After selecting the voltage commutation or the current commutation, the commutation controller 22 internally calculates a gate pulse signal for turning on or off the bidirectional switches 6 so as to generate an output per phase (U, V, and W). Based on the gate pulse signal, the commutation controller 22 outputs a control signal for turning on or off each transistor to gate terminals of a plurality of transistors included in the bidirectional switches 6. The commutation controller 22 turns one bidirectional switch 6 from on to off, and then, turns the next bidirectional switch 6 from off to on after a predetermined dead time. In this manner, the bidirectional switches 6 connected to U-phase, V-phase, and W-phase are sequentially turned on or off in a predetermined order. A dead time is provided when the bidirectional switches 6 are turned on or off. This is to prevent a flow of a short-circuit current due to the multiphase switches being turned on simultaneously.

The input clock generator 11 generates an input clock signal having a frequency three times or 3×M times (M is a natural number) the frequency fin of the three-phase input AC signal. As shown by the dashed line in FIG. 2, the input clock signal may be generated with reference to the three-phase input AC signal. When the frequency of the input clock signal is made 3×M times the frequency of the three-phase input AC signal, it becomes easier to generate an input current command vector that is substantially synchronized with the three-phase input AC signal.

Furthermore, the input clock signal may be substituted with an output clock signal generated by the after-mentioned output clock generator 14. At this time, the three-phase input AC signal may be referred to.

The input clock signal generated by the input clock generator 11 is input to the input current command generator 12. The input current command generator 12 generates the input current command vector (first command signal) iin as shown by the dashed arrow line in FIG. 5. More specifically, the input current command generator 12 generates an input current command vector in a direction rotated at the angular velocity $\omega in=2\pi fin$ from the initial value of the input current command vector at any time. Supposed that a power factor of the three-phase input AC signal is good, generally, it is appropriate to input either phase of the three-phase input AC signal and detect a voltage phase of the signal and match a phase of the initial value of the input current command vector with the phase of the signal as shown in FIG. 2.

The space vector modulator 13 performs space vector modulation using the vector diagram in FIG. 5, and then, uses two reference vectors Ia and Ib adjacent to the input current command vector and one zero vector Iz so as to generate the switching function [Srp Ssp Stp; Srn Ssn Stn] (first switching function) of the current-based virtual PWM rectifier 7.

On the other hand, the output clock generator 14 generates an output clock signal having a frequency three times or 3×L times (L is a natural number) a frequency fR of the output AC signal. By making the frequency of the output clock signal 3×L times the frequency fR of the output AC signal, it becomes easy to generate the frequency fc of the carrier signal (for example, 3 times or 3×N times (N is a natural number) the frequency fR of the output AC signal). The output clock signal generated by the output clock generator 14 is input to the output voltage command generator 15.

The output voltage command generator 15 generates an output voltage command vector (second command signal) vout as shown by the dashed arrow line in FIG. 6A and also generates the carrier signal. As described above, the output voltage command generator 15 generates the output voltage command vector in a direction rotated at the angular velocity ωout=2πfout from the initial value of the output voltage command vector at any time. The generated output voltage command vector is supplied to the second switching function calculator 17. Furthermore, the generated output voltage command vector and carrier signal are input to the second switching function calculator 17, to the current direction calculator 21 of each phase, and to the voltage commutation section indication generator 20.

The second switching function calculator 17 uses the vector diagram in FIG. 6A to perform the single-pulse driving on the voltage-based virtual inverter 8 and uses one reference vector closest to the output voltage command vector vout to generate the switching function [Sup Svp Swp; Sun Svn Swn] (second switching function) of the voltage-based virtual inverter 8 shown in FIG. 6A.

The output clock signal generated by the output clock generator 14 is used to sample the first switching function generated by the first switching function calculator 16 so as to output an identical sampling frequency which enables easy calculation of the first switching function [Srp Ssp Stp; Srn Ssn Stn] and the second switching function [Sup Svp Swp; Sun Svn Swn]. The third switching function calculator 18 synthesizes the first switching function and the second switching function according to the frequency of the output clock signal, and then, generates a third switching function that indicates on or off of the bidirectional switches 6 for generating an output per phase (U, V, and W).

The output voltage command vector generated by the output voltage command generator 15 is also supplied to the current direction calculator 21 of each phase. For simplicity sake, FIG. 2 shows the current direction calculator 21 in U-phase. The current direction calculator 21 of each phase outputs a signal to indicate a current direction to the corresponding current commutator inside the commutation controller 22. The current direction of each phase can be directly understood from the output voltage command vector because of the following facts: an output power factor reaches almost 1 and an output voltage and an output current have substantially equal phase when the load circuit 5 of the matrix converter 2 is a power transmission resonant circuit of the wireless power transmission device and when a current is substantially a sine wave and when power transmission and reception coils are facing almost straight to each other.

Specifically, in the example illustrated in FIG. 3, when the output voltage command vector is at a phase angle of 0 to 90 degrees or 270 to 360 degrees, a U-layer current is in the positive direction, and when the output voltage command vector is at other phase angles, the U-layer current is in the negative direction. When the output voltage command vector is at a phase angle of 30 to 210 degrees, a V-phase current is in the positive direction, and when the output voltage command vector is at other phase angles, the V-phase current is in the negative direction. When the output voltage command vector is at a phase angle of 150 to 330 degrees, a W-phase current is in the positive direction, and when the output voltage command vector is at other phase angles, the W-phase current is in the negative direction.

Based on the first switching function [Srp Ssp Stp; Srn Ssn Stn] from the first switching function calculator 16 and the second switching function [Sup Svp Swp; Sun Svn Swn] from the second switching function calculator 17, the third switching function calculator 18 outputs the third switching function [Sru Ssu Stu; Srv Ssv Stv; Srw Ssw Stw] used for switching of the matrix converter 2. The switching function of each matrix is input to a voltage commutator 23 of each phase (U, V, and W) and a current commutator 24 of each phase (U, V, and W).

The voltage level of the three-phase input AC signal are input to the voltage detector 19. The voltage detector 19 detects magnitudes (large, medium, and small) of the voltage level of the three-phase input AC signal and inputs a signal indicating the detection result to the voltage commutator 23 of each phase.

Actually, the magnitudes of each phase can be understood from phase information used in space vector modulation. Therefore, instead of providing the voltage detector 19, the magnitudes of the voltage level of the three-phase input AC signal may be detected from the phase information used in space vector modulation.

The commutation controller 22 includes the voltage commutator 23, the current commutator 24, and a commutation selector 25. The commutation controller 22 can be achieved by, for example, a semiconductor chip that performs signal processing such as field-programmable gate array (FPGA).

Based on the third switching function from the third switching function calculator 18, the voltage commutator 23 figures out which phase is to be switched from on to off and which phase is to be switched from off to on among the input three phases (R, S, and T). For example, in FIG. 3, with a change of the switching functions, R-phase is switched from on to off and T-phase is switched from off to on when the output voltage command vector is at a phase angle of about 80 degrees. At this time, when the voltage detector 19 shows a result that R-phase has a higher voltage than T-phase, the following procedure of the voltage commutation is prepared. In the procedure, the first step is to turn on a T-phase switch in a direction of current flow toward the load side. The next step is to turn off an R-phase switch in a direction of current flow toward the load side. Next, a T-phase switch in a direction of current flow toward the input side is turned on. Then, an R-phase switch in a direction of current flow toward the input side is turned off. Each switch is turned on or off with a dead time interposed between switching processes.

Based on the third switching function from the third switching function calculator 18, the current commutator 24 figures out which phase is to be switched from on to off and which phase is to be switched from off to on among the input three phases (R, S, and T) and prepares a procedure of the current commutation based on a signal of a current direction from the current direction calculator 21. For example, in FIG. 3, when the output voltage command vector is at a phase angle of about 60 degrees, S-phase is switched from on to off and R-phase is switched from off to on in U-phase. Furthermore, when the current direction calculator 21 in U-phase notifies that a positive current is flowing toward the load side, the current commutator 24 prepares the following procedure of the current commutation. In the procedure, the first step is to turn on an S-phase switch in a direction of current flow toward the input side. The next step is to turn off a R-phase switch in a direction of current flow toward the load side. Next, an S-phase switch in a direction of current flow toward the load side is turned on. Then, an R-phase switch in a direction of current flow toward the input side is turned off.

Whether the voltage commutator 23 or the current commutator 24 is used for the actual commutation is determined by the voltage commutation section indication generator 20 of each phase. When the voltage commutation section indication generator 20 indicates a voltage commutation section, the commutation selector 25 selects the procedure prepared by the voltage commutator 23. Furthermore, when the voltage commutation section indication generator 20 indicates a current commutation section, the commutation selector 25 selects the procedure prepared by the current commutator 24.

Herein, the voltage commutation section per phase is set to ±Tvcomm before and after a time when a current is predicted to reach a zero-cross point. Tvcomm is determined by a method to be described later. The time when a current is predicted to reach a zero-cross point can be determined from a phase angle of the output voltage command vector because an output power factor is almost 1 and an output voltage and an output current have substantially equal phase when the load of the matrix converter 2 is the power transmission resonant circuit of the wireless power transmission circuit and when a current is substantially a sine wave and when the power transmission and reception coils are facing almost straight to each other. Specifically, U-phase corresponds to a time when the output voltage command vector is at a phase angle of 90 degrees and 270 degrees, V-phase corresponds to a time when the output voltage command vector is at a phase angle of 30 degrees and 210 degrees, and W-phase corresponds to a time when the output voltage command vector is at a phase angle of 150 degrees and 330 degrees. FIG. 3 illustrates switching patterns and voltage commutation periods when the commutation occurs from input R-phase to S-phase, focusing on U-phase. In a section shown in FIG. 3, the input current command vector is at a phase angle of 60 degrees, as shown in FIG. 5.

In order to avoid commutation failure, it is desirable that the voltage commutation period Tvcomm satisfy the condition of Formula (6). By satisfying Formula (6), both voltage commutation and current commutation can be performed without using sections where both commutation failure occur frequently.

$$\left|\frac{\cos^{-1}(PF_{out})}{2\pi f_R}\right| \leq T_{VCOMM} \leq \frac{1}{12f_R} - 3T_d \quad (6)$$

Td is a dead time of the bidirectional switches 6. Therefore, 3Td is a time required for commutation using two bidirectional switches 6. In regard to fR and PFout, the former is the frequency of the output AC signal of the matrix converter 2 and the latter is a predictive value of the worst value (minimum value) when an output power factor of the matrix converter 2 degrades slightly from 1 when the power transmission and reception coils are allowed to deviate from a position at which the coils are facing straight to each other. However, since a switching frequency is very large relative to an input frequency, input voltage ripples are ignored.

The left-hand side of Formula (6) is a time range where an actual zero-cross point may shift from the zero-cross time at which an output power factor of the matrix converter 2 is assumed to be 1, assuming that the output power factor degrades to PFout when the power transmission and reception coils are allowed to deviate from the position where the coils are facing straight to each other. Therefore, selection of the voltage commutation, avoiding the current commutation at least in this time range, makes it possible to prevent opening of a current source on the output side and to prevent a surge voltage due to the current commutation near a zero-cross point. In a case where an output power factor is considered less likely to degrade, this factor can be disregarded.

With respect to the carrier frequency fc and the duty cycle dz of a zero vector in the current-based virtual PWM rectifier 7, a time section in ¼ of a carrier period accounted for the zero vector (dz/(4×fc)) is kept in the ON state in R-phase, S-phase, or T-phase. Accordingly, when this duty cycle dz can be obtained relatively easily, the voltage commutation period Tvcomm can be set by subtracting (dz/(4×fc)) from the left-hand side of Formula (6).

In a resonant load such as a wireless power transmission device, the reactance with respect to a resonant frequency component is very small. Accordingly, an output power factor of the matrix converter 2 reaches 1, and an output voltage command and an output current become equal in phase. This is why it is possible to estimate an output current direction without using a current sensor. Even when the transmission coil is displaced, it is possible to prevent commutation failure by the current commutation in a power factor range that can compensate the output current direction. On the contrary, in a section where a current is near a zero-cross point, the voltage commutation is used because the current direction cannot be estimated. Accordingly, the commutation method of this embodiment enables prevention of commutation failure without using a high-frequency current sensor.

Figure 7:
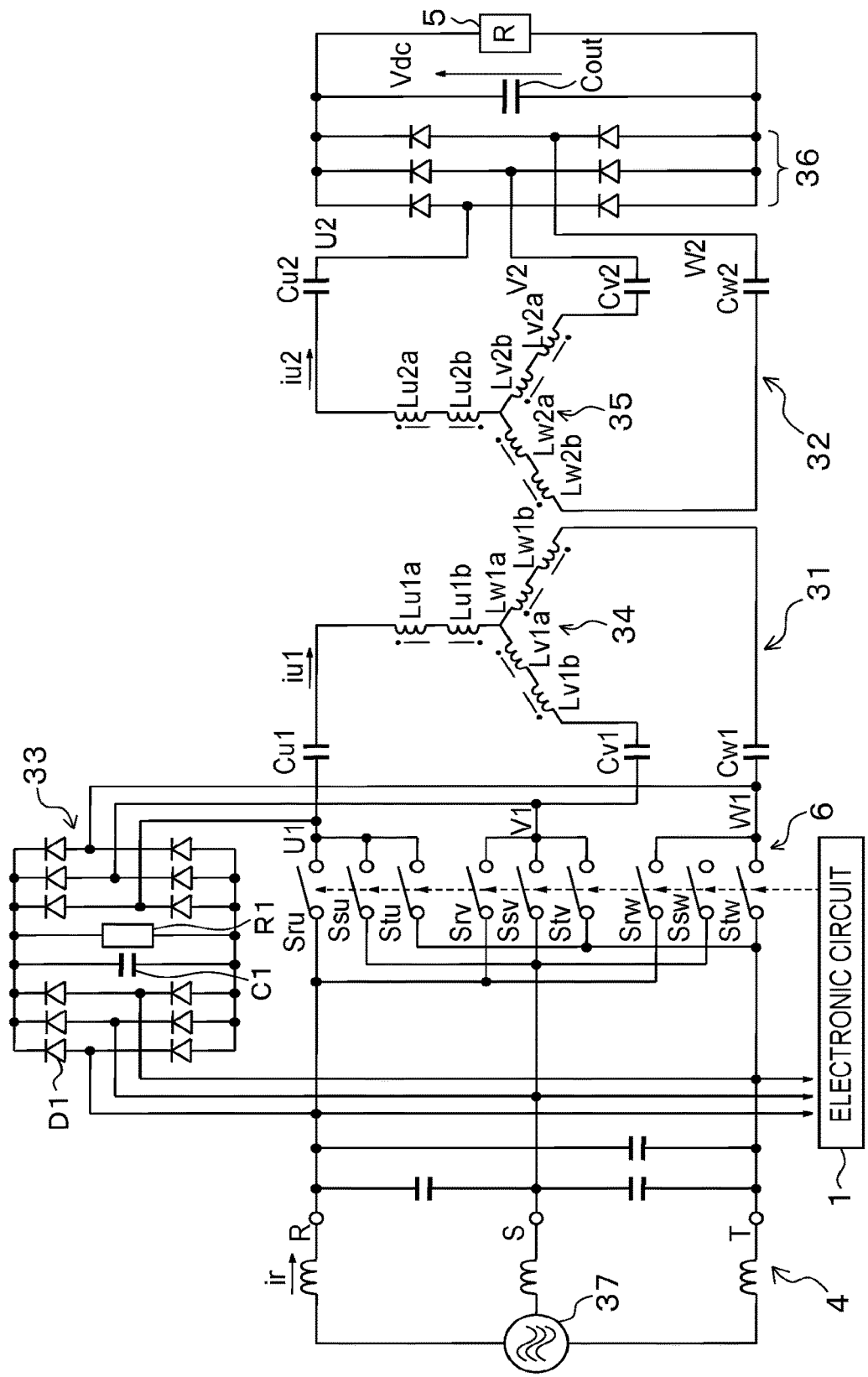
FIG. 7 is a block diagram of a schematic configuration of a wireless power transmission device including the matrix converter illustrated in FIG. 1.

FIG. 7 is a block diagram of a schematic configuration of a wireless power transmission device 30 including the matrix converter 2 illustrated in FIG. 1. The wireless power transmission device 30 in FIG. 7 includes a power transmission circuit 31 and a power reception circuit 32. To the power reception circuit 32, a load circuit 5 is connected. Note that the wireless power transmission device 30 may have only the power transmission circuit 31.

The power transmission circuit 31 includes the matrix converter 2 in FIG. 1, a snubber circuit 33, capacitors Cu1, Cv1, and Cw1, and a primary coil (power transmission coil) 34. The snubber circuit 33 prevents ringing and includes a plurality of diodes D1, a capacitor C1, and a resistance R1. The capacitors Cu1, Cv1, and Cw1 are respectively connected to U-phase, V-phase, and W-phase of the bidirectional switches 6 in the matrix converter 2. The primary coil 34 has a configuration in which a plurality of coils Lu1a, Lu1b, Lv1a, Lv1b, Lw1a, and Lw1b is Y-connected. The coils Lu1a, Lu1b, Lv1a, and Lv1b are connected between U-phase and V-phase, the coils Lu1a, Lu1b, Lw1a, and Lw1b are connected between U-phase and W-phase, and the coils Lv1a, Lv1b, Lw1a, and Lw1b are connected between V-phase and W-phase. In this manner, two coils are connected in series per phase. These coils are differentially connected. Accordingly, it is possible to cancel a leakage magnetic field at a distance and to reduce leakage magnetic fields even during high power transmission.

A resonant circuit is produced by the primary coil 34 in the power transmission circuit 31 and the capacitors Cu1, Cv1, and Cw1. This resonant circuit resonates at a resonant frequency defined by the inductance of the primary coil 34 and the capacitances of the capacitors Cu1, Cv1, and Cw1. Accordingly, a current flowing through the power transmission circuit 31 becomes a sine wave. A frequency of the aforementioned carrier signal is set to an integral multiple of 3 of the resonant frequency.

The power reception circuit 32 includes a secondary coil (power reception coil) 35, capacitors Cu2, Cv2, and Cw2, a rectifier circuit 36, and an output capacitor Cout. The secondary coil 35 is magnetically coupled to the primary coil 34 and has a configuration in which a plurality of coils Lu2a, Lu2b, Lv2a, Lv2b, Lw2a, and Lw2b is Y-connected. Similarly to the primary coil 34, the secondary coil 35 also includes two coils connected in series and differentially per phase. The coils Lu1a, Lu1b, Lv1a, and Lv1b are connected between U-phase and V-phase, the coils Lu1a, Lu1b, Lw1a, and Lw1b are connected between U-phase and W-phase, and the coils Lv1a, Lv1b, Lw1a, and Lw1b are connected between V-phase and W-phase. The capacitors Cu2, Cv2, and Cw2 are respectively connected to U-phase, V-phase, and W-phase. The rectifier circuit 36 includes a plurality of diodes connected to U-phase, V-phase, and W-phase.

To the power transmission circuit 31, for example, a commercial power supply 37 of 50 Hz to 60 Hz is connected. The matrix converter 2 in FIG. 7 converts, for example, a three-phase input AC signal of 50 Hz to 60 Hz into a three-phase output AC signal of 85 kHz.

The inventors have conducted experimental verification of the electronic circuit 1 in FIG. 2 and the wireless power transmission device 30 in FIG. 7. FIG. 8 shows various parameters of the electronic circuit 1 set in the experiment. The voltage commutation period Tvcomm is determined based on Formula (6). A value of the voltage commutation period Tvcomm is set to 1.6 μs, which is almost the intermediate value of Tvcomm. In addition, a carrier frequency and a resonant frequency are set to 3:1 in order to balance resonant currents in three phases and prevents commutation failure due to the voltage commutation.

Figure 9:
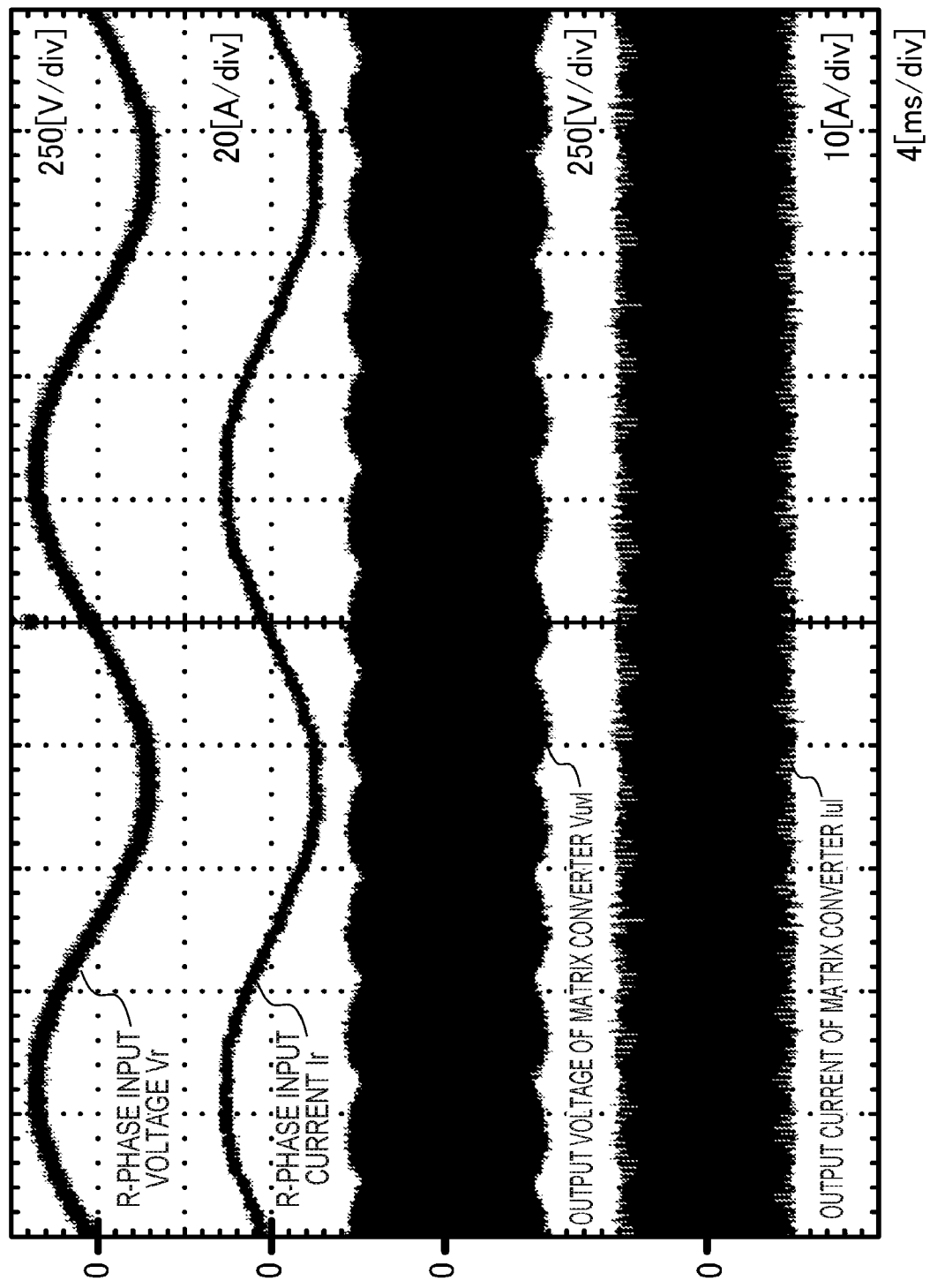
FIG. 9 is a view of an input/output waveform of the matrix converter.
Figure 10:
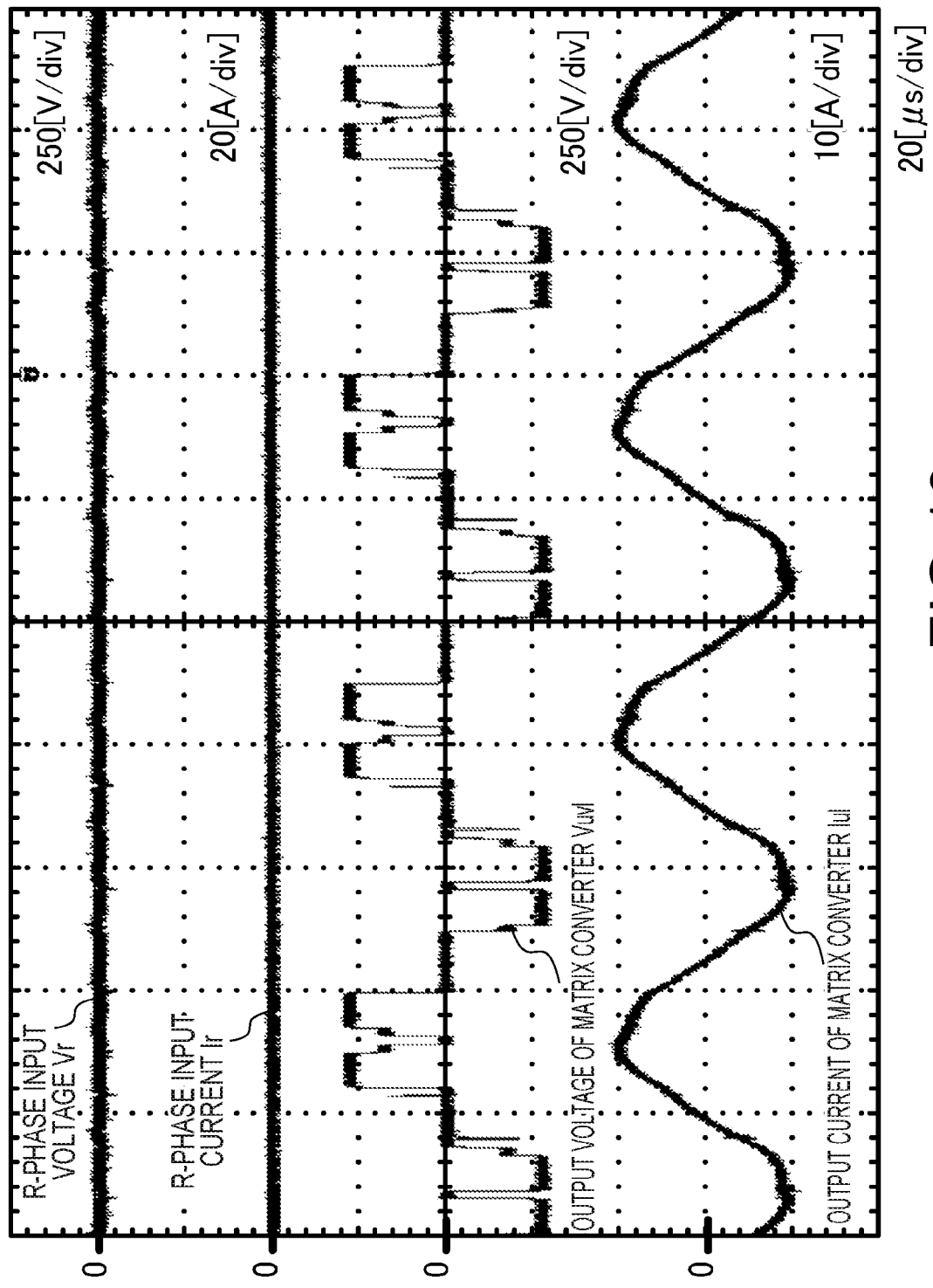
FIG. 10 is a view of an input/output waveform when sector 5 in the voltage-based virtual inverter is switched to sector 6.
Figure 11:
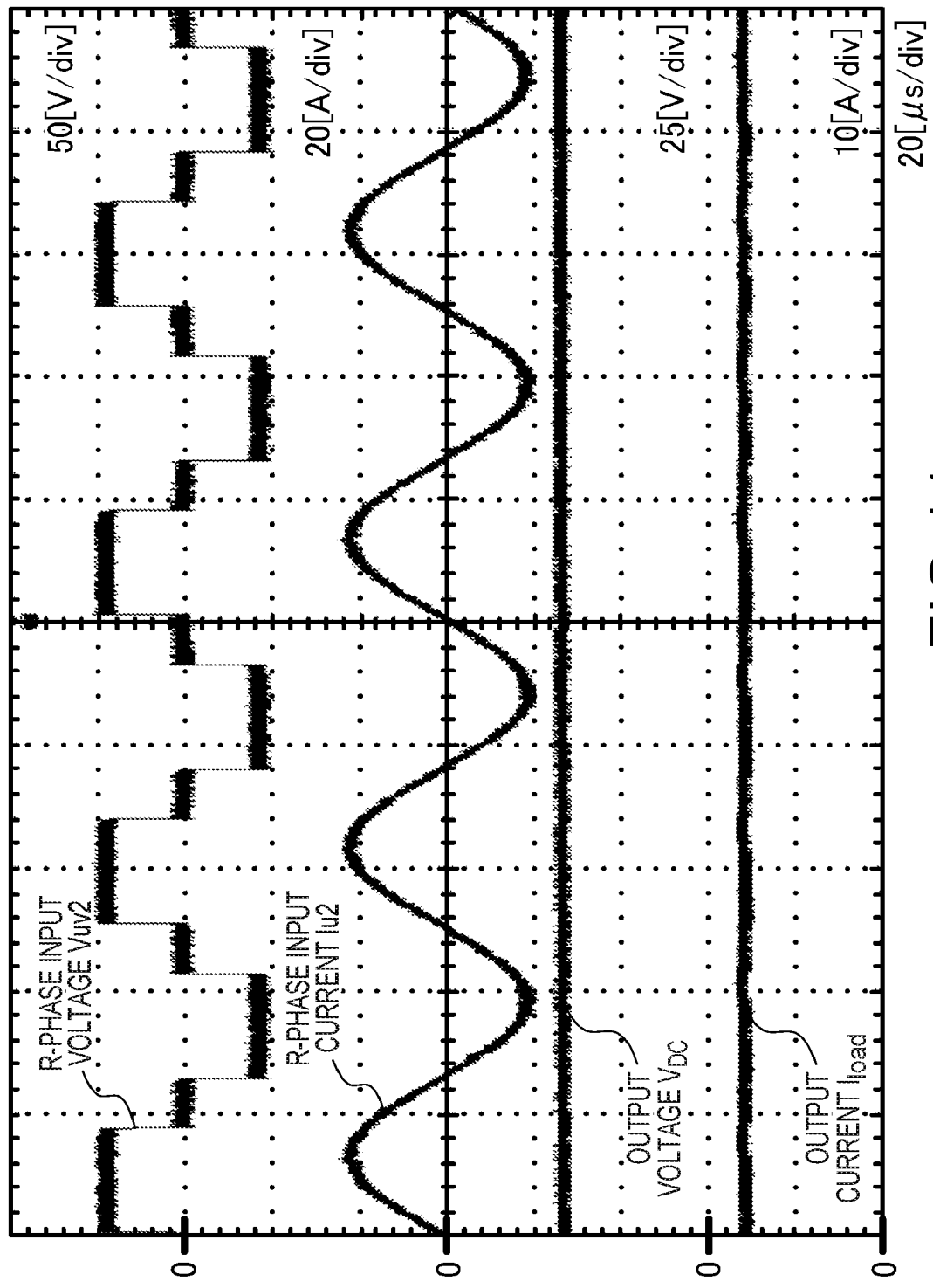
FIG. 11 is a view of an input/output waveform of a rectifier circuit 36 in a wireless power transmission device 30.

FIGS. 9 to 11 are views of waveforms illustrating experimental results of the electronic circuit 1 and the wireless power transmission device 30. More specifically, FIG. 9 is a view of an input/output waveform of the matrix converter 2 when Tvcomm=1.6 μs. FIG. 10 is a view of an input/output waveform when the voltage-based virtual inverter 8 is switched from sector 5 to sector 6. In FIG. 5.7(a), the system current distortion rate is 3.7%, which shows that no voltage commutation failure occurs because there is no distortion when input voltages are switched. FIG. 9 shows that no current commutation failure occurs because there is no surge voltage equal to or higher than the maximum instantaneous line voltage of 282 V in an output voltage of the matrix converter 2 near a zero-cross point of an output current. Furthermore, it is confirmed that an output voltage and an output current having a frequency as high as about 20 kHz are obtained. Note that a power factor on the output side is a leading power factor to a small extent, which allows adjustment of the power factor by frequencies or resonant capacitors.

FIG. 11 is a view of an input/output waveform of the rectifier circuit 36 in the wireless power transmission device 30. The results of FIG. 11 show that energy is transmitted to the secondary side of the three-phase coil and that a load voltage and a load current are made constant.

As described above, in this embodiment, the matrix converter 2 based on hybrid commutation sets a period of the voltage commutation according to time points when a carrier signal reaches a peak and a bottom and performs the current commutation at other time points. Accordingly, the matrix converter 2 enables switching between the voltage commutation and the current commutation at an optimum time point without using a current sensor. Since current sensors are high in cost and large in size, omitting a current sensor reduces component costs of the electronic circuit 1 and downsizes the electronic circuit 1.

The invention claimed is:

1. An electronic circuit configured to receive input AC signals having phases different from one another, and to control bidirectional switches corresponding to the phases to generate output AC signals having the phases and having a frequency different from a frequency of the input AC signals, and to output the output AC signals, the electronic circuit comprising:
reference signal circuitry configured to generate a reference signal having a frequency higher than the frequency of the output AC signals; and
commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry is configured to switch the bidirectional switches in parallel based on a current level of the output AC signals of the phases in a second period other than the first period,
wherein, in a phase among the phases in which a current of the output AC signals reaches zero, the commutation circuitry selects the voltage commutation in the first period including a time point when the current of the output AC signal reaches zero and selects the current commutation at a time point common to all phases in the second period other than the first period.

2. The electronic circuit according to claim 1, wherein the reference signal alternately and periodically includes a peak and a bottom, and
the commutation circuitry selects the voltage commutation for any phase in the first period including time points when the reference signal is at the peak and the bottom.

3. The electronic circuit according to claim 1, wherein the frequency of the reference signal is an integral multiple of 3 of the frequency of the output AC signals.

4. An electronic circuit configured to receive input AC signals having phases different from one another, and to control bidirectional switches corresponding to the phases to generate output AC signals having the phases and having a frequency different from a frequency of the input AC signals, and to output the output AC signals, the electronic circuit comprising:
reference signal circuitry configured to generate a reference signal having a frequency higher than the frequency of the output AC signals; and
commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry is configured to switch the bidirectional switches in parallel based on a current level of the output AC signals of the phases in a second period other than the first period,
wherein the first period or Tvcomm is represented by the following Formula (1) where fR is the frequency of the output AC signals of the bidirectional switches, PFout is a predictive value of a minimum value when an output power factor of the bidirectional switches degrades from 1, and Td is a dead time of the bidirectional switches $$\left|\frac{\cos^{-1}(PF_{out})}{2\pi f_R}\right| \le T_{vcomm} \le \frac{1}{12f_R} - 3T_d \qquad (1)$$

5. An electronic circuit configured to receive input AC signals having phases different from one another, and to control bidirectional switches corresponding to the phases to generate output AC signals having the phases and having a frequency different from a frequency of the input AC signals, and to output the output AC signals, the electronic circuit comprising:
reference signal circuitry configured to generate a reference signal having a frequency higher than the frequency of the output AC signals; and
commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry is configured to switch the bidirectional switches in parallel based on a current level of the output AC signals of the phases in a second period other than the first period,
input clock circuitry configured to generate an input clock signal having a frequency faster than the frequency of the input AC signals;
first command signal circuitry configured to generate a first command signal to control a current-based virtual PWM rectifier that operates in an equivalent manner to the bidirectional switches;
a first switching function calculator configured to generate a first switching function that indicates on or off of switches inside the current-based virtual PWM rectifier based on the first command signal;
output clock circuitry configured to generate an output clock signal having a frequency faster than the frequency of the output AC signals;
second command signal circuitry configured to generate a second command signal for controlling a voltage-based virtual inverter based on the output clock signal;
a second switching function calculator configured to generate a second switching function that indicates on or off of switches inside the voltage-based virtual inverter based on the second command signal;
a third switching function calculator configured to generate a third switching function that indicates on or off of the bidirectional switches by synthesizing the first switching function and the second switching function according to the frequency of the output clock signal; and
commutation section indication circuitry configured to input an indication signal to the commutation circuitry to indicate whether the commutation circuitry selects the voltage commutation or the current commutation based on the output clock signal and the reference signal.

6. The electronic circuit according to claim 5,
wherein the second command signal circuitry comprises the reference signal circuitry configured to generate the reference signal based on the output clock signal.

7. The electronic circuit according to claim 5,
wherein the commutation circuitry comprises:
a voltage commutator configured to generate a switching signal of the bidirectional switches during the voltage commutation based on the third switching function;
a current commutator configured to generate a switching signal of the bidirectional switches during the current commutation based on the third switching function; and
a commutation selector configured to select the switching signal of the bidirectional switches generated by the voltage commutator or the current commutator based on the indication signal.

8. The electronic circuit according to claim 5, comprising
a voltage detector configured to detect magnitudes of a voltage level of the input AC signals having the phases,
wherein the voltage commutator generates a switching signal of the bidirectional switches during the voltage commutation based on the third switching function and a detection signal from the voltage detector.

9. The electronic circuit according to claim 1, comprising
a resonant circuit driven by the output AC signals having the phases and configured to resonate at a predetermined resonant frequency,
wherein the resonant circuit comprises a power transmission coil.

10. The electronic circuit according to claim 9,
wherein a frequency of the reference signal is an integral multiple of 3 of the resonant frequency.

11. The electronic circuit according to claim 1,
wherein the number of the phases is three.

12. A wireless power transmission device comprising:
bidirectional switches provided per phase, the bidirectional switches being configured to generate, based on input AC signals having phases different from one another, output AC signals having phases and having a frequency different from a frequency of the input AC signals;
a power transmission coil configured to generate a magnetic flux for wireless power transmission by making a flow of an AC current corresponding to the output AC signals;
reference signal circuitry configured to generate a reference signal having a frequency faster than the frequency of the output AC signals; and
a commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry switches the bidirectional switches in parallel based on a current level of the output AC signals of the phases in a second period other than the first period,
wherein, in a phase among the phases in which a current of the output AC signals reaches zero, the commutation circuitry selects the voltage commutation in the first period including a time point when the current of the output AC signal reaches zero and selects the current commutation at a time point common to all phases in the second period other than the first period.

13. The wireless power transmission device according to claim 12,
wherein the reference signal alternately and periodically includes a peak and a bottom, and
the commutation circuitry selects the voltage commutation for any phase in the first period including time points when the reference signal is at the peak and the bottom.

14. The wireless power transmission device according to claim 12,
wherein the frequency of the reference signal is a frequency that is an integral multiple of 3 of the frequency of the output AC signals.

15. A wireless power transmission device comprising:
bidirectional switches provided per phase, the bidirectional switches being configured to generate, based on input AC signals having phases different from one another, output AC signals having phases and having a frequency different from a frequency of the input AC signals;
a power transmission coil configured to generate a magnetic flux for wireless power transmission by making a flow of an AC current corresponding to the output AC signals;
reference signal circuitry configured to generate a reference signal having a frequency faster than the frequency of the output AC signals; and
a commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry switches the bidirectional switches in parallel based on a current level of the output AC signals of the phases in a second period other than the first period,
wherein the first period or Tvcomm is represented by the following Formula (1) where fR is the frequency of the output AC signals of the bidirectional switches, PFout is a predictive value of a minimum value when an output power factor of the bidirectional switches degrades from 1, and Td is a dead time of the bidirectional switches $$\left| \frac{\cos^{-1}(PF_{out})}{2\pi f_R} \right| \leq T_{vcomm} \leq \frac{1}{12 f_R} - 3T_d \tag{1}$$

16. A wireless power transmission device comprising:
bidirectional switches provided per phase, the bidirectional switches being configured to generate, based on input AC signals having phases different from one another, output AC signals having phases and having a frequency different from a frequency of the input AC signals;
a power transmission coil configured to generate a magnetic flux for wireless power transmission by making a flow of an AC current corresponding to the output AC signals;
reference signal circuitry configured to generate a reference signal having a frequency faster than the frequency of the output AC signals;
a commutation circuitry configured to control switching between voltage commutation and current commutation, wherein, in the voltage commutation, the commutation circuitry is configured to switch the bidirectional switches corresponding to the phases in sequence based on a voltage level of the output AC signals of the phases in a first period before and after a time point when an amplitude of the reference signal becomes a specific amplitude value, and in the current commutation, the commutation circuitry switches the bidirectional switches in parallel based on a current level of the output AC signals of the phases in a second period other than the first period,
input clock circuitry configured to generate an input clock signal having a frequency faster than the frequency of the input AC signals;
first command signal circuitry configured to generate a first command signal to control a current-based virtual PWM rectifier that operates in an equivalent manner to the bidirectional switches;
a first switching function calculator configured to generate a first switching function that indicates on or off of switches inside the current-based virtual PWM rectifier based on the first command signal;
output clock circuitry configured to generate an output clock signal having a frequency faster than the frequency of the output AC signals;
a second command signal generator configured to generate a second command signal for controlling a voltage-based virtual inverter based on the output clock signal;
a second switching function calculator configured to generate a second switching function that indicates on or off of switches inside the voltage-based virtual inverter based on the second command signal;
a third switching function calculator configured to generate a third switching function that indicates on or off of the bidirectional switches by synthesizing the first switching function and the second switching function according to the frequency of the output clock signal; and
commutation section indication circuitry configured to input an indication signal to the commutation circuitry to indicate whether the commutation circuitry selects the voltage commutation or the current commutation based on the output clock signal and the reference signal.

17. The wireless power transmission device according to claim 16,
wherein the second command signal generator comprises the reference signal circuitry configured to generate the reference signal based on the output clock signal.

18. The wireless power transmission device according to claim 16,
wherein the commutation circuitry comprises:
a voltage commutator configured to generate a switching signal of the bidirectional switches during the voltage commutation based on the third switching function;
a current commutator configured to generate a switching signal of the bidirectional switches during the current commutation based on the third switching function; and
a commutation selector configured to select the switching signal of the bidirectional switches generated by the voltage commutator or the current commutator based on the indication signal.

* * * * *